United States Patent [19]

Szanati

[11] 4,450,951
[45] May 29, 1984

[54] CONVEYOR LIFT
[76] Inventor: Jules J. Szanati, 6857 Duffy Rd., Delaware, Ohio 43015
[21] Appl. No.: 413,757
[22] Filed: Sep. 1, 1982
[51] Int. Cl.³ ............................................. B65G 47/84
[52] U.S. Cl. .................................... 198/482; 198/796
[58] Field of Search ............... 198/482, 796, 798, 646, 198/800

[56]  References Cited
U.S. PATENT DOCUMENTS

| 1,969,122 | 8/1934 | DeWitt | 198/607 |
| 3,403,794 | 10/1968 | Lopez | 198/482 X |
| 4,214,848 | 7/1980 | Verwey et al. | 198/796 X |
| 4,273,234 | 6/1981 | Bourgeois | 198/482 X |

Primary Examiner—Joseph E. Valenza
Assistant Examiner—Stuart Millman
Attorney, Agent, or Firm—Robert B. Watkins

[57]  ABSTRACT

A conveyor lift system employing an endless flexible conveyor means capable of transferring loads from an exterior position on one side to an exterior position on the other side without secondary mechanical means through the use of finger-like support elements which pass among each other without contact, and transfer the loads. The loads may be lifted off from a lower level position and moved to a higher level position, or vice versa, and the system works as well in either direction.

10 Claims, 3 Drawing Figures

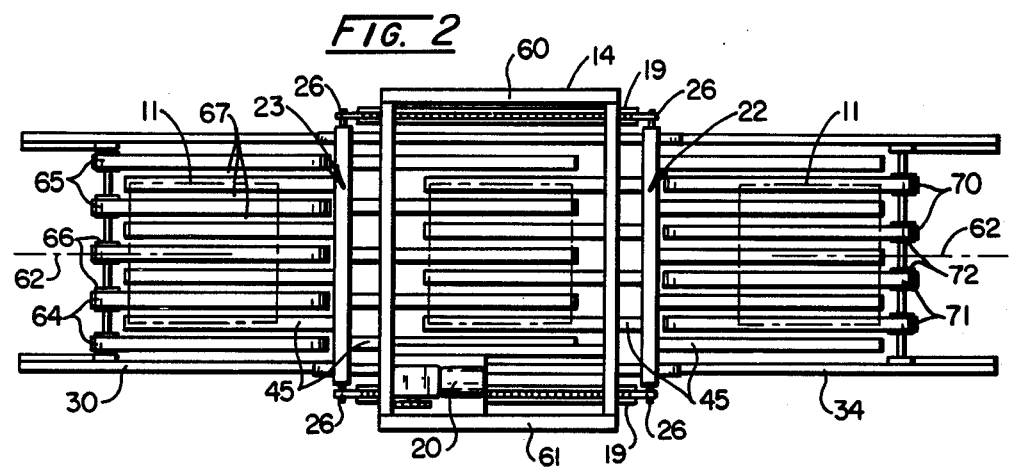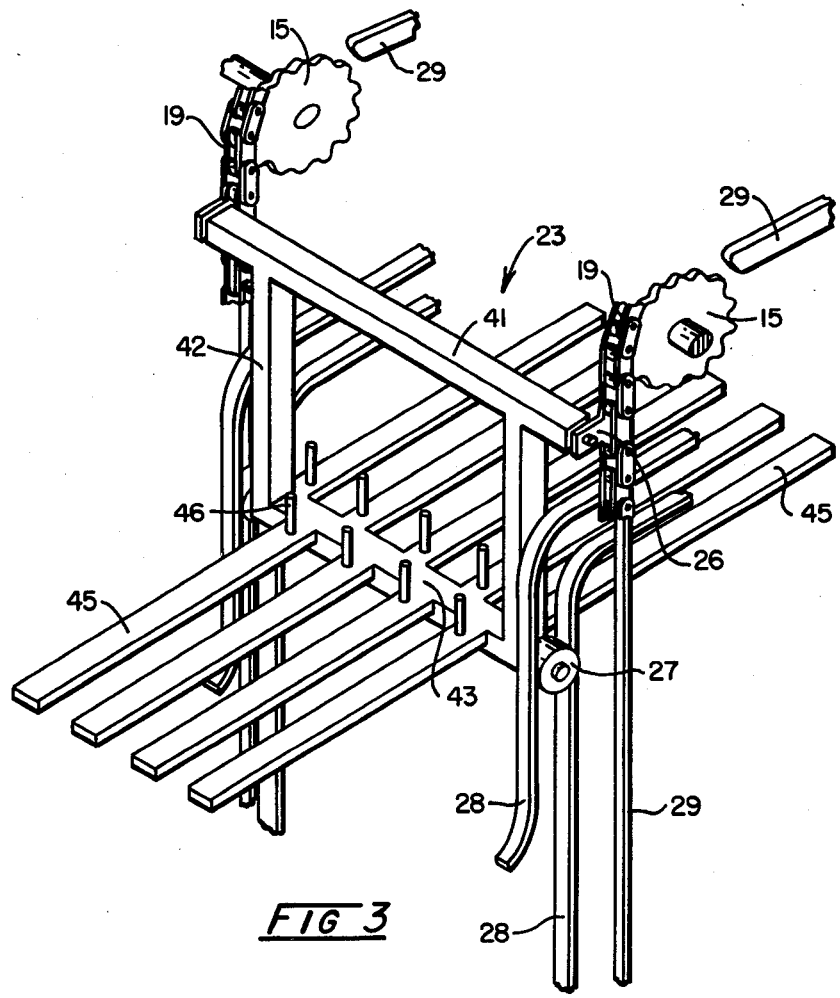

CONVEYOR LIFT

SUMMARY OF THE INVENTION

This invention relates to a conveyor apparatus for transferring loads or articles from one level to another. More particularly, it is a reversible conveyor system constructed to pass the articles from a loading side to an unloading side of conveyor carriages which are carried by the system. The apparatus is capable of simple yet efficient lift off, transport, and put down of articles of variable size and weight.

Briefly and in summary, this invention comprises a flexible endless conveyor means arranged to pass and travel over a plurality of wheels at least one of which is at a lower level than the other; a drive means is operable to move the endless conveyor means between and around the wheels; a plurality of carriages are rotatively suspended from the conveyor means, with each carriage having a plurality of support means projecting on opposite sides, with the support means comprising a composite platform of alternate spaces between load supporting elements, and with the elements on each side being alternately spaced from the opposite side; and with the conveyor means being constructed to travel in a path which passes a portion in proximity to another portion so that the elements of the support members on one side of each carriage pass through the alternate spaces in the elements of the other side of another carriage. The proximity of the passing elements is such that loads on preceding carriages are transferred to succeeding carriages.

In a preferred embodiment, the conveyor system of this invention employs two parallel endless chains which are flexibly drawn over four rectangularly arranged pairs of sprocket wheels. Attached to these chains are a plurality of carriages having a shape generally similar to an inverted T. The horizontal base support means of the carriage is composed of finger-like extension elements on each side of a center cross member. The extension elements are alternately oppositely spread on the opposite sides.

In operation, as the conveyor chains move in their sprocket guided path, the carriage's finger-like lifting elements pass between each other on opposite sides and pass the load from one carriage to another enabling the system to transfer the load off onto a loading platform without the assistance of auxiliary mechanical means.

In the history of lifting conveyors where it is necessary to maintain a horizontal position of the load, there have been many methods proposed to ameliorate the problems inherent in on-loading on one side and off-loading on the other side. If the loading carriage extends outward to engage the parcel to be lifted, the mechanism necessary to maintain the horizontal position leaves the parcel within the confines of the support structure, from where it must be removed by auxiliary means.

If the carriage hangs centrally below the carriage attachment, a method must be found to move the parcel into position where it can be engaged. Concomitantly, a similar mechanism must be found to remove it from the interior of the support structure. Many solutions to this problem have employed secondary mechanisms which are specifically designed to accomplish this transposition. This necessarily adds complicating factors to the arrangement and interrelation of these parts.

One previous example of prior patent art which uses solenoid extended magnets to accomplish this function is described in U.S. Pat. No. 3,403,794—Lopez.

A method of eliminating the necessity for the auxiliary mechanism is described in U.S. Pat. No. 1,969,122—DeWitt, where precisely placed pallets of specific size are moved in certain sequence into position to be picked up by carriers with extended flanges. While this eliminates the auxiliary mechanism, a considerable number of pallets are necessary and complications will develop to assure proper placement of the pallets for engagement by the flange carriers, as this system is inherently imprecise.

It is a purpose of this invention to accomplish the necessary locational adjustment without the aid of any auxiliary mechanisms in a simple and efficient manner. It is a further purpose to accomplish this transferral with parcels of varying shapes and sizes with consistent accuracy. In addition, it is an object to provide a conveyor lift system that may be easily transportable and adjustable while requiring a minimum of setup effort or operational space.

Other objects and features of the invention will be apparent and understood from the detailed description of the invention and the accompanying drawings which follow.

DESCRIPTION OF THE DRAWINGS

FIG. 2 is a top plan view of the apparatus of this invention.

FIG. 3 is a perspective view in partial section of a carriage unit portion of this invention, with flexible endless conveyor chains engaged with the sprocket wheels.

DETAILED DESCRIPTION OF THE INVENTION

Figure 1:
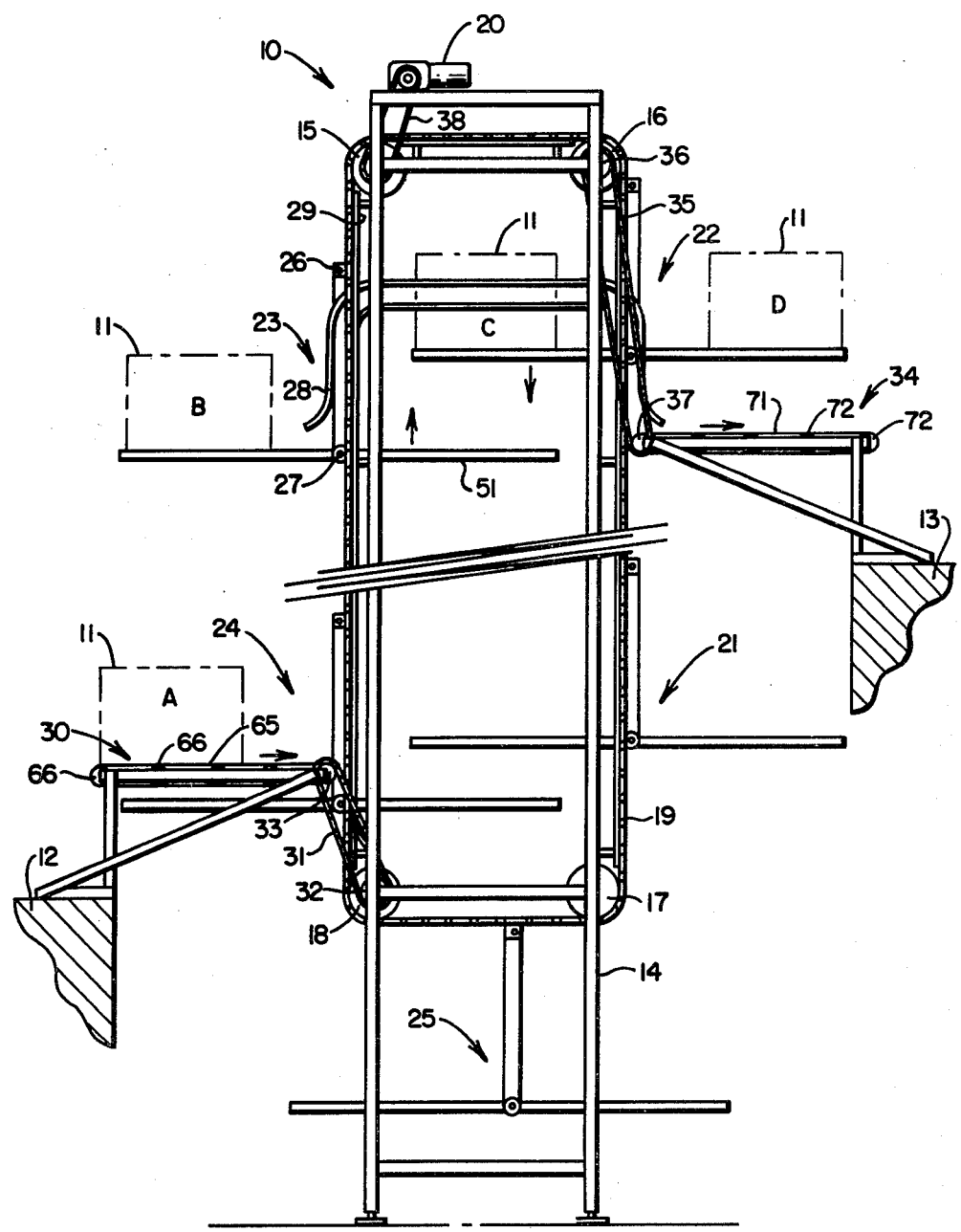
FIG. 1 is a front elevational view of the lift conveyor of this invention.

In FIG. 1, the conveyor lift system 10 of this invention is shown in positions on-loading, transporting, and off-loading parcels or loads 11 from a lower level on-loading platform 12 to a higher level off-loading platform 13. A frame structure 14, preferably constructed of metal, supports four pairs of sprocket wheels 15, 16, 17, 18 around which are stretched flexible endless conveyor means 19, such as chain. The endless conveyor chain 19 is propelled by the sprocket wheel 15 which is connected to a drive means 20, such as an electric motor, by an endless pulley chain 38.

Attached to the flexible chain 19 are a plurality of carriages 21, 22, 23, 24, 25 shown in sequential positions around the closed loop of endless conveyor 19. As most clearly shown in FIG. 3, the carriages 21–25 are rotatively attached to a stub link 26 of the endless chain 19. Guide means or rollers 27 roll along rail guide means 28 serving to ensure proper travel of the carriages in a preselected attitude or alignment. Another chain guide means 29 serves as a guide or rail for the endless flexible chain conveyor 19. The rail guides 28 maintain the proper alignment position of the carriages 21–25 as the chain passes over the sprocket wheels 15–18 by moving the rollers or guide wheels 27 in the same radius as the sprocket wheels 15–18.

Construction of the framed structure 14 may be conventional and composed of welded metal components. As shown in FIG. 2 in the preferred embodiment, the apparatus is made up of oppositely disposed sides 60 and 61. In general, one side 60 is the mirror image of the other side 61 about the central plane shown by the center line 62. When constructed in this manner there are parallel spaced matching components of endless conveyor means. For instance, there are oppositely disposed conveyor chains 19, between which are suspended the carriages 21-25.

While the oppositely disposed parallel spaced matching components are preferred, the apparatus could be constructed with the carriages cantilevered out from a single endless conveyor means on one side, and in some circumstances such a construction might be used.

The apparatus is shown with two higher sprockets 15-16 and two lower sprockets 17-18 and it is believed that in general this configuration will be best suited for a majority of the applications of this invention. Nevertheless, it should be understood, that the number of sprockets and their position whether substantially vertical above one another, or not, is a matter of design convenience and those skilled in the art may select other numbers of sprocket wheels, some being driving wheels with connections to a drive means 20, some being idlers, some being adjustable to vary the tension in the conveyor system.

The number of wheels being variable, the number could be reduced to one at the higher level and one at the lower level, if the size of the sprocket wheels are suitabley constructed in relation to the rest of the mechanism. Such a "single" wheel arrangement would necessarily require wheels of much larger diameter, but in some circumstances might be useful.

An on-loading conveyor means 30 is supported upon the lower platform 12. The mechanism 30 comprises a plurality of laterally spaced belts and pulleys or chains and sprockets 65 and 66, respectively. As seen in FIG. 2, the fingers 64 are spaced apart from one another providing gaps 67.

The pulleys 66 are connected to the conveyor means 19 by an endless chain 31 traveling over a secondary sprocket wheel 32 which is attached coaxially to a sprocket wheel 18 and connected in turn to a drive train mechanism 33 of the on-loading conveyor means 30. The drive train mechanism 33 causes the loads 11, placed upon the on-loading conveyor mechanism 30 to be moved into position for lift off by the carriages in a manner to be later described herein.

A similar off-loading means 34 is placed in position on the opposite side of the conveyor lift system of this invention. It acts to move loads 11 away from the point of put down from the carriage 22, and is driven by an endless chain 35 traveling over a secondary sprocket wheel 36 which is attached coaxially to a sprocket wheel 16 and connected to drive mechanism 37.

Off-loading means 34 is of a similar construction to onloading means 30. Spaced apart fingers 70 comprising belts or chains 71 pass over pulleys or sprockets 72 in the direction of the arrow shown in FIG. 1.

Driven by the drive mechanism 37 the off-loading conveyor means 34 causes the loads 11 to be carried away from the conveyor system 10 when they are placed on the belts or chains 70 by the carriages 21-25 in manner to be further described.

In the alternative, the on-loading means 30 and the off-loading means 34 may be supported directly from the frame structure 14, rather than from the platforms 12 and 13 respectively. Such support could be accomplished by conventionally constructed braces, struts, or legs.

All of the carriages 21-25 are the same or similar to one another in certain important respects. As a matter of convenience in describing these carriages, one of the carriages 23 is shown in FIG. 3 approaching an uppermost position in the conveyor system 10.

The carriage 23 is provided with a main lateral frame member 41 which is rotatively suspended between the stub links 26 of the conveyor chain 19. Edge frame members 42 support a main frame member 43 from from which project support means or elements 45 which are fixed in alternate spaced relation on opposite sides of the main cross member 43. The elements, in composite, comprise a platform which carries the loads 11. Protruding stopper pegs 46 serve to keep the loads 11 from sliding from one side of the carriage to the other.

The guide wheels 27 are shown within the confines of the wheel guides 28, where they maintain the correct alignment of the carriage 23 in a preselected position, usually with the platform horizontal. Likewise the chain guides 29 maintain the conveyor chain 19 in the proper position. When viewed from the edge, as shown in FIG. 1, the configuration of the carriage is generally in the shape of an inverted "T".

FIG. 2 illustrates the spaced relationship of the support elements 45 of the carriages 21-25. The support elements 45 of one carriage 23 are arranged to pass through the alternate spaces in the support elements 45 of the other carriage 22 without contact. In the same manner, they pass through the extending fingers 64 and 70 of the on-loading and off-loading conveyor mechanisms 30 and 34, respectively. Thus, they are able to lift off or put down a parcel or load.

Referring again to FIG. 1, in the operation of this invention, a load/parcel 11 is placed upon the on-loading conveyor mechanism 30 which automatically moves it into position for the support elements 45 of carriage 24 to engage the parcel 11 in the position shown as A. As the endless conveyor 19 moves up and around in its guided path, the load 11 moves to position B, and then to position C where it begins to descend. At this position an interior side 51 of carriage 23, at this time moving up, brings support elements 45 into contact with the load 11 and removes it from the preceding carriage 22. In following sequence, as the carriage 23 moves up and over to replace carriage 22, the load 11 is on the opposite side of the conveyor system in position D, ready to be deposited onto off-loading mechanism 34.

In the operation of the apparatus as described, the loads are lifted and transferred from one side to the other by the simple continuous movement of the carriages through the system.

During the operation, portions of the endless conveyor means pass in such proximity to other portions that the elements of the support members on one side of each carriage pass through the alternate spaces between the elements of the other side, the proximity of passing positions being such that loads on preceding carriages are transferred to succeeding carriages.

While the system has been described in what is thought to be a preferred embodiment, other arrangements may be used. For instance, the carriages may be suspended in an inverted position from that shown in FIG. 1; i.e., with the T bar on top. In an alternative construction the endless conveyor may be molded of rubber or plastic material.

Many of the advantageous freatures of the invention are accentuated when the apparatus is constructed and operated in the vertical lift position; however, operation in an inclined position may be appropriate in certain situations. Of course, the degree of inclination will meet limitations, as to proximity of passing conveyor portions, during the load transferring part of the conveyor travel.

An important feature of this invention is that it is reversible. If the rotation of the drive means 20 is reversed, the entire system will operate in the opposite direction and loads may be lifted off a higher level and put down on a lower level, or even the same level.

It is herein understood although the present invention has been specifically disclosed with preferred embodiments and examples, modification and variations of the concepts herein disclosed may be resorted to by those skilled in the art. Such modifications and variations are considered to be within the scope of the invention and the appended Claims.

What is claimed is:

1. A conveyor system for transferring loads between different levels comprising:
    a. a flexible endless conveyor means arranged to pass and travel over a plurality of wheels at least one of which is at a lower level and at least one of which is at a higher level;
    b. drive means operable to move the endless conveyor means between and around the at least one lower and higher level wheels;
    c. a plurality of carriages rotatively suspended from the endless conveyor means, each carriage having a plurality of support means projecting on opposite sides, the support means comprising in composite a platform of alternate spaces between supporting elements for the loads being conveyed by the conveyor system, the elements on each side being alternately spaced from the opposite side; and
    d. the flexible endless conveyor means being constructed to travel through positions which pass a portion in proximity to another portion with the elements of the support members on one side of each carriage passing through the alternate spaces between the elements of the other side of another carriage, the proximity of passing positions being such that loads on preceding carriages are transferred to succeeding carriages.

2. A conveyor system according to claim 1 wherein the flexible endless conveyor means is a chain and the wheels are sprockets mating to the chain.

3. A conveyor system according to claim 1 wherein the flexible endless conveyor means comprises parallel spaced matching components and the plurality of carriages are rotatively suspended between the components.

4. A conveyor system according to claim 1 wherein the at least one wheel at the higher level is substantially vertically positioned above the at least one wheel at the lower level.

5. A conveyor system according to claim 1 wherein the flexible endless conveyor means passes over a plurality of laterally spaced wheels at the lower level and a plurality of laterally spaced wheels at the upper level.

6. A conveyor system according to claim 5 wherein the plurality of wheels at the upper level is two and the plurality of wheels at the lower level is two.

7. A conveyor system according to claim 1 wherein the carriages comprise a frame which is rotatively connected to the flexible endless conveyor means at an edge, the support elements project from the frame at an angle on each side, and the configuration of the carriage is generally in the shape of a T when viewed from the edge.

8. A conveyor system according to claim 1 wherein a loading and unloading means are provided having projecting fingers for supporting the load, the fingers passing between the alternate spaces of the elements projecting from the opposite sides of the carriages.

9. A conveyor system according to claim 8 wherein the projecting fingers comprise conveyor apparatus to bring the load into position above the elements projecting from the carriages or to convey the load away from the elements projecting from the carriages.

10. A conveyor system according to claim 1 wherein guide means are provided in parallel alignment with the path of the points of rotative suspension of the carriages, the guide means maintaining a preselected alignment of the carriages during the passing of carriages and the passing of loads.

* * * * *